US012804449B2

(12) United States Patent
Li

(10) Patent No.: US 12,804,449 B2
(45) Date of Patent: Nov. 17, 2026

(54) REDUCING CHANNEL INTERFERENCE

(71) Applicant: JRD COMMUNICATION (SHENZHEN) LTD., Shenzhen (CN)

(72) Inventor: Zhiyuan Li, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 678 days.

(21) Appl. No.: 18/300,412

(22) Filed: Apr. 14, 2023

(65) Prior Publication Data

US 2023/0254728 A1 Aug. 10, 2023

Related U.S. Application Data

(63) Continuation-in-part of application No. PCT/CN2020/134950, filed on Dec. 9, 2020.

(30) Foreign Application Priority Data

Oct. 15, 2020 (CN) ......................... 202011103804.6

(51) Int. Cl.
*H04W 72/541* (2023.01)
*H04W 28/02* (2009.01)
*H04W 72/0453* (2023.01)

(52) U.S. Cl.
CPC ... *H04W 28/0236* (2013.01); *H04W 72/0453* (2013.01); *H04W 72/541* (2023.01)

(58) Field of Classification Search
CPC ......... H04W 28/0236; H04W 72/0453; H04W 72/541; H04W 16/10; H04J 11/0056; H04L 25/03006
See application file for complete search history.

(56) References Cited

U.S. PATENT DOCUMENTS

2013/0194950 A1* 8/2013 Haghighat ............ H04L 5/0035 370/252
2014/0169200 A1* 6/2014 Woo .................... H04W 72/541 370/252

(Continued)

FOREIGN PATENT DOCUMENTS

CN 102098739 A 6/2011
CN 102711169 A 10/2012

(Continued)

OTHER PUBLICATIONS

Written Opinion of the International Search Authority in international application No. PCT/CN2020/134950, mailed on Jul. 15, 2021.

(Continued)

*Primary Examiner* — Jeffrey M Rutkowski
(74) *Attorney, Agent, or Firm* — PV IP PC; Wei Te Chung

(57) ABSTRACT

A method for reducing channel interference includes: a micro base station receiving channel state information reported by a user equipment and calculating a sub-band interference value based on the channel state information; the micro base station generating interference level information by comparing the sub-band interference value with a preset interference threshold, the interference level information indicating one of a first level and a second level, wherein the first level corresponds to the sub-band interference value being greater than the interference threshold, and the second level corresponds to the sub-band interference value being not greater than the interference threshold; the micro base station transmitting to a macro base station a sub-frame configuration request carrying the interference level information; and the macro base station configuring, in (Continued)

response to the sub-frame configuration request, a sub-frame in a sub-frame configuration mode.

16 Claims, 3 Drawing Sheets

(56) References Cited

U.S. PATENT DOCUMENTS

| | | | | |
|---|---|---|---|---|
| 2015/0049693 | A1 | 2/2015 | Seo et al. | |
| 2015/0103683 | A1* | 4/2015 | Kim | H04J 11/0059 370/252 |
| 2015/0264652 | A1* | 9/2015 | Zhang | H04W 52/247 455/522 |
| 2015/0304131 | A1 | 10/2015 | Seyama | |
| 2015/0305004 | A1* | 10/2015 | Ohta | H04W 72/52 370/330 |
| 2016/0183134 | A1 | 6/2016 | Auer et al. | |
| 2017/0111926 | A1* | 4/2017 | Madan | H04W 72/542 |
| 2017/0150388 | A1* | 5/2017 | Wen | H04L 5/00 |
| 2017/0272131 | A1* | 9/2017 | Ananth | H04B 7/0413 |
| 2017/0310384 | A1* | 10/2017 | Park | H04W 72/21 |
| 2017/0317856 | A1 | 11/2017 | Lee et al. | |
| 2021/0385818 | A1* | 12/2021 | Levitsky | H04W 72/541 |
| 2025/0203641 | A1* | 6/2025 | Fazili | H04W 72/541 |
| 2026/0181476 | A1* | 6/2026 | Lnu | H04W 28/023 |

FOREIGN PATENT DOCUMENTS

| | | | |
|---|---|---|---|
| CN | 102761973 | A | 10/2012 |
| CN | 104054383 | A | 9/2014 |

OTHER PUBLICATIONS

International Search Report in International application No. PCT/CN2020/134950, mailed on Jul. 15, 2021.

KDDI, “Performance evaluations of reduced power ABS”, 3GPP TSG RAN WG1 Meeting #67 R1-114164, Nov. 18, 2021.

Chinese Office Action issued in corresponding Chinese Patent Application No. 202011103804.6 dated Nov. 2, 2021, pp. 1-5.

Notification to Grant Patent Right for Invention issued in corresponding Chinese Patent Application No. 202011103804.6 dated Mar. 2, 2022, pp. 1-4.

* cited by examiner

REDUCING CHANNEL INTERFERENCE

CROSS-REFERENCE TO RELATED APPLICATIONS

This application is a continuation of International Application No. PCT/CN2020/134950, filed on Dec. 9, 2020, which claims priority to and the benefit of Chinese Patent Application No. 202011103804.6, filed on Oct. 15, 2020. The disclosures of the aforementioned applications are incorporated herein by reference in their entireties.

TECHNICAL FIELD

The present application relates to wireless communication technologies, and more particularly, to reduction of channel interference.

BACKGROUND

Long Term Evolution Advanced (LTE-Advanced) has an important feature of supporting heterogeneous network deployment, in which micro cells are deployed within the coverage area of a macro cell and each of the micro cells includes a pico base station (BS), a home base station or a relay node. In this manner, more efficient spectrum multiplexing can be achieved, thereby increasing capacity and supporting local high traffic density. One way is to share the same spectrum. However, in a co-channel heterogeneous network, interference issues are prominent. As shown in FIG. 1, a downlink signal from a micro cell to a User Equipment (UE) near the edge of the micro cell is interfered by a downlink signal from the macro base station to the UE, and an uplink signal from another UE, which belongs to the macro cell and is near the micro base station, to the macro base station is interfered by an uplink signal from the another UE to the micro base station.

To solve the interference issues, Inter-Cell Interference Coordination (ICIC) technologies have been proposed. The ICIC technologies include a number of interference reduction technologies, one of which is to use Almost Blank Sub-frames (ABSs) for reducing transmission power and activity.

Ideally, in the macro-micro scenario, the macro cell may configure the ABSs to be all blank sub-frames to minimize interference to the user equipment served by the micro cell. Blank resource elements (REs) do not transmit any data and thus have no power, thereby reducing the interference. Since a large number of RE resources cannot be used to transmit data, the resource cost of such ABSs is excessively high, and spectrum resources cannot be effectively utilized.

SUMMARY

In view of the above, an embodiment of the present application provides a method for reducing channel interference, including:

- a micro base station receiving channel state information reported by a user equipment and calculating a sub-band interference value based on the channel state information;
- the micro base station generating interference level information by comparing the sub-band interference value with a preset interference threshold, the interference level information indicating one of a first level and a second level, wherein the first level corresponds to the sub-band interference value being greater than the interference threshold, and the second level corresponds to the sub-band interference value being not greater than the interference threshold;
- the micro base station transmitting to a macro base station a sub-frame configuration request carrying the interference level information; and
- the macro base station configuring, in response to the sub-frame configuration request, a sub-frame in a sub-frame configuration mode comprising one of:
  - in response to determining that the interference level information in the sub-frame configuration request indicates the first level, configuring the sub-frame as an almost blank sub-frame; and
  - in response to determining that the interference level information in the sub-frame configuration request indicates the second level, configuring the sub-frame in segments.

Another embodiment of the present application provides a device for reducing channel interference, including:

- a calculation unit for receiving channel state information reported by a user equipment to calculate a sub-band interference value by a micro base station according to the channel state information;
- a setting unit for presetting an interference threshold;
- an indication unit for transmitting the sub-band interference value by the micro base station to request configuration of one or more sub-frames;
- an application unit for applying a sub-frame configuration mode by the micro base station;
- a notification unit for notifying the user equipment of the sub-frame configuration mode by the micro base station; and
- a feedback unit for feeding back a sub-frame configuration state and an available sub-frame configuration mode to the macro base station.

Yet another embodiment of the present application provides a system for reducing channel interference, including a micro base station and a macro base station, where the micro base station is configured to: receive channel state information reported by a user equipment and calculate a sub-band interference value based on the channel state information; generate interference level information by comparing the sub-band interference value with a preset interference threshold, the interference level information indicating one of a first level and a second level, wherein the first level corresponds to the sub-band interference value being greater than the interference threshold, and the second level corresponds to the sub-band interference value being not greater than the interference threshold; and transmit to the macro base station a sub-frame configuration request carrying the interference level information; and the macro base station configuring, in response to the sub-frame configuration request, a sub-frame in a sub-frame configuration mode comprising one of: in response to determining that the interference level information in the sub-frame configuration request indicates the first level, configuring the sub-frame as an almost blank sub-frame; and in response to determining that the interference level information in the sub-frame configuration request indicates the second level, configuring the sub-frame in segments.

DETAILED DESCRIPTION

Some embodiments of the present application will be described in detail below with reference to the accompanying drawings. It should be understood that the embodiments are to be described for illustration only, but not intended to limit the present application.

Figure 1:
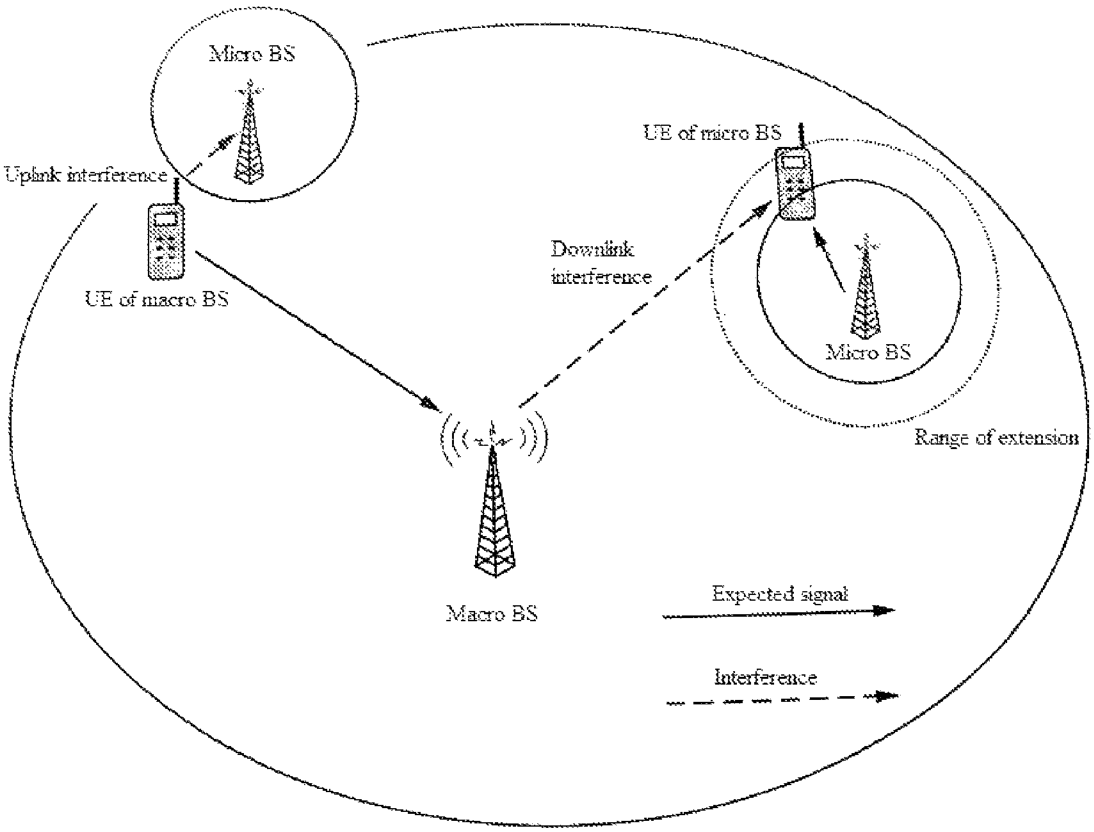
FIG. 1 is a schematic diagram of a scenario in which there is interference in an uplink and a downlink of a heterogeneous network in the related art.
Figure 2:
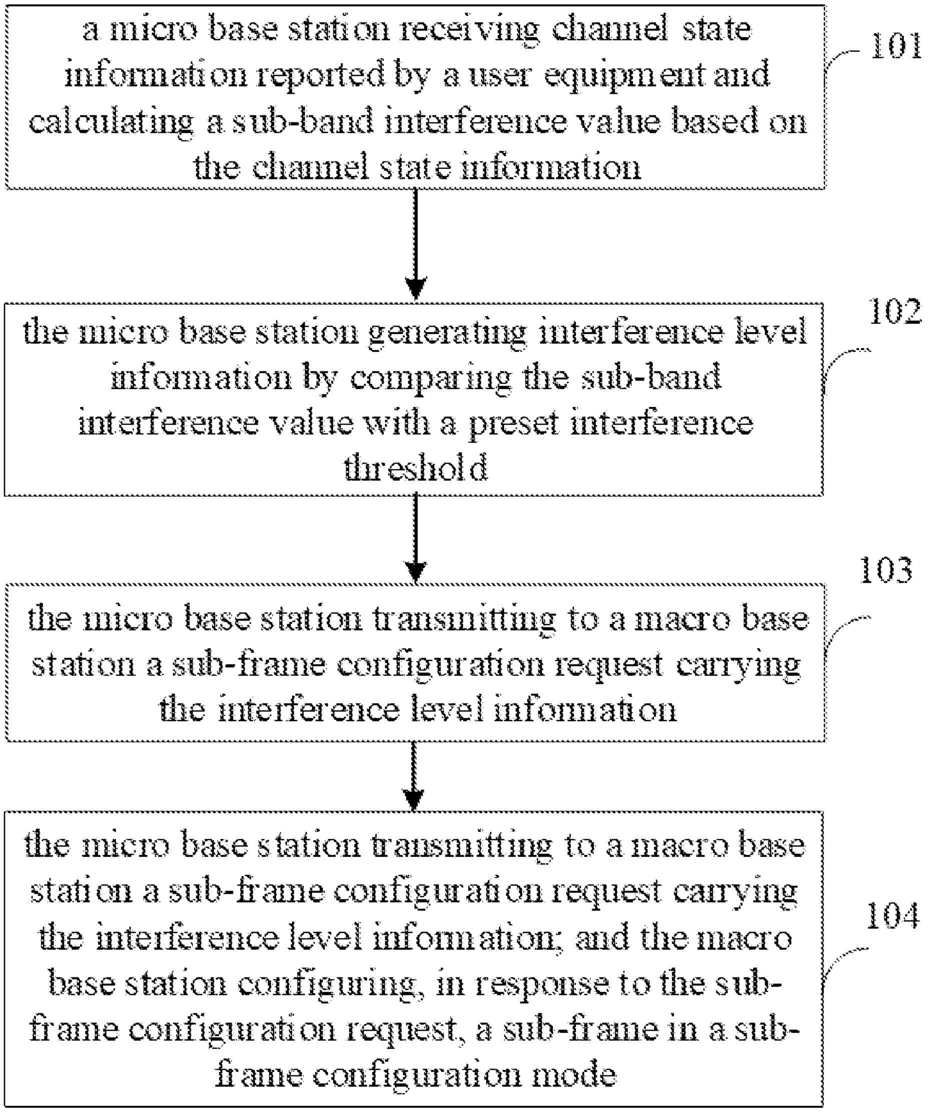
FIG. 2 is a schematic flow diagram of a method for reducing channel interference according to an embodiment of the present application.

As shown in FIG. 2, a specific flow of the method for reducing channel interference may be as follows:

101: a micro base station receiving channel state information reported by a user equipment and calculating a sub-band interference value according to the channel state information.

In particular, channel state information reported by a user equipment is received by the micro base station to calculate a sub-band interference value according to the channel state information.

For example, the interfered user equipment calculates a channel quality indication (CQI) and feeds back the CQI to the micro base station using sub-band channels. The micro base station receives the channel quality indication to calculate a sub-band interference value according to the channel quality indication.

Alternatively, CQI feedback includes Widband CQI feedback and Subband CQI feedback. The Widband CQI feedback means that the full bandwidth feeds back only one CQI, and the feedback granularity is very coarse. The Subband CQI feedback means that the full bandwidth is divided into several sub-bands, and then CQI of each of the sub-bands is fed back, and the feedback granularity is finer. In the embodiment of the present application, the Subband CQI feedback is used, and a band in which the interfered user equipment is located is divided into a plurality of sub-bands, and each of the sub-bands feeds back a channel quality indication to the micro base station.

The channel state information includes the CQI, a pre-coding indication (PMI), a pre-coding type indication (PTI), a rank indication (RI), and the like. The interfered user equipment feeds back the channel state information including the CQI to the micro base station, and then the micro base station receives the channel state information such as the CQI, the PMI, the PTI, and the RI.

A reporting mode of the user equipment is configured by a higher layer, including aperiodic reporting (cqi-ReportModeAperiodic) and periodic reporting (cqi-FormatIndicatorPeriodic). The periodic reporting is that the micro base station may configure reporting of the user equipment at intervals and is generally used to feed back the most basic information. The aperiodic reporting is that the micro base station explicitly notifies the user equipment of reporting, and then the user equipment may report in response to the notification. The micro base station may instruct in the downlink scheduled Downlink Control Information (DCI) the user equipment to report. There are many different kinds of configurations of the reporting according to different situations. The reporting of the user equipment is based on the configuration of the micro base station, but a content reported in any of the configurations includes the CQI. According to the reported channel state information, the micro base station can determine where the interference with the interfered user equipment is serious and where the interference with the interfered user equipment is light in the bandwidth of the interfered user equipment.

102: the micro base station generating interference level information by comparing the sub-band interference value with a preset interference threshold, the interference level information indicating one of a first level and a second level, wherein the first level corresponds to the sub-band interference value being greater than the interference threshold, and the second level corresponds to the sub-band interference value being not greater than the interference threshold.

In particular, the preset interference threshold may be configured by the micro base station. For example, the micro base station needs to preset an interference threshold for comparison with the sub-band interference value calculated by the micro base station so as to determine the interference level of the user equipment. The interference threshold may be set according to the actually calculated sub-band interference value.

Alternatively, the set interference threshold is used to determine the interference level of the user equipment. In an embodiment of the present application, if the sub-band interference value calculated by the micro base station is greater than the interference threshold, it is indicated that the interference level of the sub-band is serious. If the sub-band interference value calculated by the micro base station is less than the interference threshold, it is indicated that the interference level of the sub-band is medium, and a level in which the interference level is medium can be set to be 60% of the serious interference level.

103: the micro base station transmitting to a macro base station a sub-frame configuration request carrying the interference level information.

In particular, the micro base station may request the macro base station to configure one or more sub-frames, and then the macro base station may configure the sub-frames according to the requesting.

For example, after the micro base station identifies the interfered user equipment, the macro base station performs sub-frame coordination with the micro base station via an X2 interface of Inter-Cell Interference Coordination (ICIC) to obtain sub-frame coordination information, and then the macro base station performs frequency domain selective scheduling according to the sub-frame coordination information to configure the sub-frames.

There are two cases for the configuration of the sub-frames. When the sub-band interference value is greater than the interference threshold, the sub-frames are configured as ABSs, that is, all resource elements are blanked. When the sub-band interference value is less than the interference threshold, the sub-frames are configured in segments, that is, a portion of the resource elements are blanked, and the remaining resource elements are reserved for transmission of user data.

The ICIC is one of interference coordination technologies, which is used to solve inter-cell interference in co-frequency networking. The ICIC has a number of interference reduction technologies, one of which is to use ABSs that are defined as sub-frames for reducing transmission power and activity.

The X2 interface is an interconnection interface between eNodeBs (base stations in LTE), which supports direct transmission of data and signaling. The sub-frame configuration information is exchanged between the micro base station and the macro base station via the X2 interface.

Alternatively, after the macro base station configures the sub-frame in response to the sub-frame configuration request, the macro base station may transmit to the micro base station a sub-frame message indicating the sub-frame configuration mode, and then in response to the sub-frame message, the micro base station may apply the sub-frame configuration mode and notify the user equipment of the sub-frame configuration mode, and the micro base station may feed back sub-frame configuration state information to the macro base station. For example, after the micro base station identifies the interfered user equipment, the micro base station obtains the interference level of the user equipment and transmits information of the interference level of the user equipment to the macro base station to request the macro base station to configure one or more sub-frames. The macro base station configures the sub-frames according to the requesting of the micro base station, and transmits a sub-frame message and a measurement subset. The micro base station applies a sub-frame configuration mode, notifies the interfered user equipment of the sub-frame configuration mode, and feeds back a downlink sub-frame configuration state and an available sub-frame mode to the macro base station.

The micro base station identifying the interfered user equipment is implemented by: the user equipment served by the micro base station calculating a channel quality indication and feeding back the channel quality indication and other channel state information of each of the sub-bands to the micro base station to report the channel quality indication and other channel state information, so that the micro base station calculates a sub-band interference value of the user equipment.

The micro base station performs sub-frame coordination with the macro base station, that is, the micro base station obtains an interference value of each of the sub-bands after identifying the interfered user equipment, and transmits a request for configuration of the sub-frames to the macro base station, and the macro base station performs configuration of corresponding sub-frames according to the interfered situation of the user equipment served by the micro base station.

The micro base station performs frequency domain selective scheduling. That is, the micro base station allocates an appropriate sub-band resource to the user equipment in the frequency domain according to the interference information fed back by the user equipment.

104: the macro base station configuring, in response to the sub-frame configuration request, a sub-frame in a sub-frame configuration mode comprising one of: in response to determining that the interference level information in the sub-frame configuration request indicates the first level, configuring the sub-frame as an almost blank sub-frame; and in response to determining that the interference level information in the sub-frame configuration request indicates the second level, configuring the sub-frame in segments.

For example, the micro base station divides a band in which the interfered user equipment is located into a plurality of sub-bands. The user equipment calculates the CQI, and feeds back the CQI and other channel state information such as the PMI, the PTI, and the RI to the micro base station. When a sub-band interference value calculated by the micro base station according to the sub-band channel state information fed back by the user equipment is greater than an interference threshold, the micro base station configures the sub-frames as the almost blank sub-frames. If the interference value of the sub-band calculated by the micro base station is greater than the interference threshold, it is indicated that the interference level of the sub-band is serious, and all the resource elements are blanked, and no user data is transmitted on the blanked resource elements, so that the power of the blank space is zero, thereby reducing interference with the user equipment. RE refers to a resource element and is the smallest resource unit in a physical resource.

Each of the sub-frames is always provided with a Physical Broadcast Channel (PBCH) and a synchronization signal. Even if the transmission of the sub-frame carrying the physical broadcast channel and the synchronization signal is performed, the power of the ABS is smaller than that of the normal sub-frame. Therefore, the configuration of the ABS reduces interference with the data and the control channel of the co-channel of the neighboring cell.

There must be a cell-specific reference signal (CRS) on the user equipment, and the location of the CRS is fixed. When the ABS is configured, the resource element in which the CRS is located is reserved.

For example, the micro base station divides a band in which the interfered user equipment operates into a plurality of sub-bands one of which is used to carry the sub-frame. The user equipment calculates the CQI and feeds back the CQI and other channel state information such as the PMI, the PTI, and the RI to the micro base station. When a sub-band interference value calculated by the micro base station according to the sub-band channel state information fed back by the user equipment is less than an interference threshold, the micro base station configures the sub-frames in segments. The configuration of the sub-frames in segments includes blanking a portion of resource elements of the sub-frame while reserving remaining resource elements of the sub-frame for transmission of user data.

Alternatively, in an embodiment of the present application, 12 sub-carriers are one sub-carrier group, and the REs in which 4 of the 12 sub-carriers are located are selected to be blanked while the REs in which the remaining sub-carriers are located are reserved for transmission of data. The number of sub-carriers on the sub-band is a multiple of 12. The REs in which the sub-carriers at the same locations of all sub-carrier groups are blanked while the REs in which the remaining sub-carriers are located are reserved for transmission of data. The number of blanked sub-carriers may be set according to the interference situation.

If the interference value of the sub-band calculated by the micro base station is less than the interference threshold, it is indicated that the interference level of the sub-band is medium, and thus it is not necessary to blank all the resource elements, that is, to blank a portion of the resource elements, no user data is transmitted on the blanked resource elements, and the remaining resource elements are reserved for transmission of Physical Downlink Shared Channel (PDSCH) data.

There must be a cell-specific reference signal (CRS) on the user equipment, and the location of the CRS is fixed. When the resource elements (RE) is blanked, the resource element in which the CRS is located is reserved.

Figure 3:
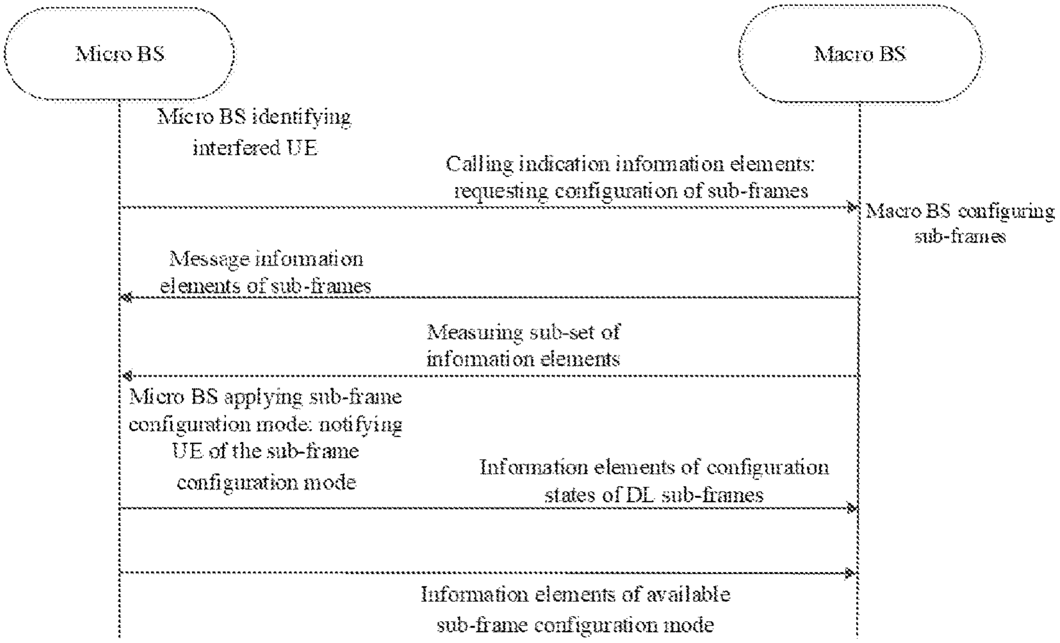
FIG. 3 is a schematic diagram of exchanging sub-frame configuration information via an X2 interface in a method for reducing channel interference according to an embodiment of the present application.

As shown in FIG. 3, sub-frame configuration information may be exchanged via the X2 interface as follows.

After the micro base station applies the sub-frame configuration mode and notifies the user equipment of the sub-frame configuration mode, the micro base station may feed back available sub-frame mode information to the macro base station. For example, after the micro base station identifies the interfered user equipment, the micro base station requests configuration of the sub-frames. The macro base station configures the sub-frames according to the requesting configuration of the sub-frames, and transmits a sub-frame message and a measurement subset. The micro base station applies a sub-frame configuration mode, notifies the interfered user equipment of the sub-frame configuration mode, and feeds back a downlink sub-frame configuration state and an available sub-frame mode to the macro base station.

The micro base station identifying the interfered user equipment is implemented by: the user equipment served by the micro base station calculating a channel quality indication (CQI), feeding back the channel quality indication and other channel state information of each of the sub-bands such as a pre-coding indication (PMI), a pre-coding type indication (PTI), and a rank indication (RI) to the micro base station to report the channel state information fed back by the user equipment, so that the micro base station calculates the sub-band interference value of the user equipment. After receiving the requesting of configuration of the sub-frames from the micro base station, the macro base station configures the sub-frames according to the interference level of each of the sub-bands.

There are two modes of configuring the sub-frames by the macro base station. According to the interference level of the user equipment served by the micro base station, the sub-band interference level of the user equipment served by the micro base station is serious, that is, the sub-band interference value is greater than the set interference threshold, and thus the macro base station configures the sub-frames in an almost blank sub-frame mode; and the sub-band interference level of the user equipment served by the micro base station is not serious, that is, the sub-band interference value is less than the set interference threshold, and thus the macro base station configures the sub-frames in a segmented configuration sub-frame mode, i.e., a portion of resource elements are blanked, while remaining resource elements are reserved for transmission of user data. After configuring of the sub-frames by the macro base station is completed, the user equipment served by the micro base station applies the sub-frame configuration mode.

The transmission of a sub-frame message, that is, each bit informing a receiving end (the micro base station) of the intention of a transmitting end (the macro base station) with respect to the transmission power, is based on the sub-frame level. The purpose of the measurement subset is to recommend a suitable set of sub-frames to the receiving-end (the micro base station) for potential user equipment having sub-frames not configured as ABSs, which may be subject to interference.

The micro base station feeding back the downlink sub-frame configuration state to the macro base station is implemented by: feeding back a current channel situation of the sub-frames measured by the micro base station to the macro base station. The micro base station feeding back the available sub-frame mode to the macro base station is implemented by: feeding back information such as the number of almost blank sub-frames that the micro base station desires to configure and time slots to the macro base station.

Figure 4:
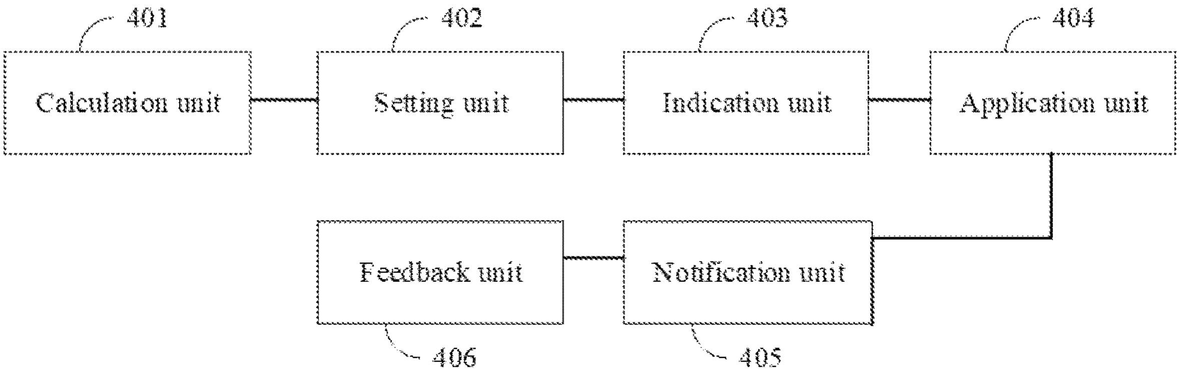
FIG. 4 is a schematic block diagram of a device for reducing channel interference according to an embodiment of the present application.

To better implement the above method, an embodiment of the present application may also provide a device for reducing channel interference. For example, as shown in FIG. 4, the device for reducing channel interference may include a calculation unit 401, a setting unit 402, an indication unit 403, an application unit 404, a notification unit 405, and a feedback unit 406, as follows.

The calculation unit 401 may be configured for receiving channel state information reported by a user equipment to calculate a sub-band interference value by a micro base station according to the channel state information. For example, the calculation unit 401 can be configured such that the micro base station divides a band in which the interfered user equipment is located into a plurality of sub-bands, the user equipment calculates a channel quality indication (CQI), feeds back the CQI and other sub-band channel state information such as a pre-coding indication (PMI), a pre-coding type indication (PTI), a rank indication (RI), and reports the sub-band channel state information fed back by the user equipment to calculate the sub-band interference threshold.

A setting unit 402 may be configured for presetting an interference threshold. For example, the setting unit 402 can be configured such that the micro base station sets an interference threshold for determining the interference level of the user equipment. If the sub-band interference value obtained by the micro base station is greater than the interference threshold, it is indicated that the interference level of the sub-band is serious. If the sub-band interference value obtained by the micro base station is less than the interference threshold, it is indicated that the interference level of the sub-band is medium, and a level in which the interference level is medium can be set to be 60% of the serious interference level.

An indication unit 403 may be configured for transmitting the sub-band interference value by the micro base station to request configuration of the sub-frame. For example, after calculating the sub-band interference value, the micro base station determines the interference level of the user equipment, transmits the sub-band interference value to the macro base station, and requests the macro base station to configure the sub-frames.

An application unit 404 may be configured for applying a sub-frame configuration mode by the micro base station. For example, after receiving the requesting configuration of the sub-frames by the micro base station, the macro base station configures the sub-frames according to the interference situation of the user equipment transmitted by the micro base station. Then, the macro base station transmits the configured sub-frame mode to the micro base station, and the micro base station applies the sub-frame configuration mode transmitted by the macro base station.

A notification unit 405 may be configured for notifying the user equipment of the sub-frame configuration mode by the micro base station. For example, after the micro base station applies the sub-frame configuration mode transmitted by the micro base station, the sub-frame configuration mode is notified to the user equipment served by the micro base station.

A feedback unit 406 may be configured for feeding back the sub-frame configuration state and an available sub-frame configuration mode to the macro base station. For example, the micro base station feeding back the sub-frame configuration status to the macro base station is implemented by: feeding back the current channel state of the sub-frame measured by the micro base station to the macro base station. The micro base station feeding back the available sub-frame mode to the macro base station is implemented by feeding back information such as the number of almost blank sub-frames that the micro base station desires to configure and time slots to the macro base station.

In the method for reducing channel interference provided in the embodiment of the present application, the device for reducing channel interference provided in the embodiment of the present application is integrated in a micro base station, and functions implemented by the micro base station are as follows.

The micro base station identifying the interfered user equipment is implemented by: the micro base station dividing a band in which the interfered user equipment is located into a plurality of sub-bands, the user equipment calculating the CQI, and feeding back the CQI and other channel state information such as the PMI, the PTI, and the RI to the micro base station, the micro base station calculating the sub-band interference value by receiving the sub-band channel state information fed back by the user equipment to determine where the interference with the interfered user equipment is serious and where the interference with the interfered user equipment is light in the bandwidth of the interfered user equipment.

The micro base station presets the interference threshold for comparison with the calculated sub-band interference value, so as to determine the interference level of the user equipment, then transmits the sub-band interference value, i.e., the interference level of the user equipment to the macro base station, and requests the macro base station to configure the sub-frames.

The micro base station receives the sub-frame configuration mode of the macro base station, and applies the sub-frame configuration mode. The sub-frame configuration mode includes two types of following: configuring the sub-frame as almost blank sub-frames in response to the sub-band interference value being greater than the interference threshold; and configuring the sub-frames in segments in response to the sub-band interference value being smaller than the interference threshold. The micro base station informs the interfered user equipment of the sub-frame configuration mode.

The micro base station feeding back the sub-frame configuration status to the macro base station is implemented by: feeding back the current channel status of the sub-frame measured by the micro base station to the macro base station. The micro base station feeding back the available sub-frame mode to the macro base station is implemented by: feeding back information such as the number of almost blank sub-frames (ABSs) that the micro base station desires to configure and time slots to the macro base station.

Correspondingly, an embodiment of the present application further provides a system for reducing channel interference, including a micro base station and a macro base station, where the micro base station is configured to: receive channel state information reported by a user equipment and calculate a sub-band interference value based on the channel state information; generate interference level information by comparing the sub-band interference value with a preset interference threshold, the interference level information indicating one of a first level and a second level, wherein the first level corresponds to the sub-band interference value being greater than the interference threshold, and the second level corresponds to the sub-band interference value being not greater than the interference threshold; and transmit to the macro base station a sub-frame configuration request carrying the interference level information; and the macro base station configuring, in response to the sub-frame configuration request, a sub-frame in a sub-frame configuration mode comprising one of: in response to determining that the interference level information in the sub-frame configuration request indicates the first level, configuring the sub-frame as an almost blank sub-frame; and in response to determining that the interference level information in the sub-frame configuration request indicates the second level, configuring the sub-frame in segments.

It can be seen from the above description that the embodiments of the present application provide the method, the device, and the system for reducing channel interference. The micro base station obtains the sub-band interference value according to the reporting of the interfered user equipment, and sets the interference threshold. The micro base station requests the macro base station to configure one or more sub-frames, and the macro base station configures the sub-frames according to the requesting. In response to the sub-band interference value being greater than the interference threshold, the sub-frames are configured as the almost blank sub-frames. In response to the sub-band interference value being less than the interference threshold, the sub-frames are configured in segments. The technical solution utilizes a portion of resource elements to transmit user data without all resource elements being configured as almost blank sub-frames that cannot transmit the user data. As such, the spectrum resources are effectively utilized to improve resource utilization, while another portion of resource elements are blank sub-frames that cannot transmit any data to reduce interference with the user equipment served by the micro cell.

Some embodiments of the present application have been described above, but not intended to limit the scope of the present application. Any variations, equivalent substitutions, modifications and the like within the spirit and principles of the present application are intended to fall within the scope of the present application.

What is claimed is:

1. A method for reducing channel interference, comprising:

a micro base station receiving channel state information reported by a user equipment and calculating a sub-band interference value based on the channel state information, wherein the channel state information comprises a channel quality indication, a pre-coding indication, a pre-coding type indication, and a rank indication, and the sub-band interference value is calculated based on at least the channel quality indication reported by the user equipment;

the micro base station generating interference level information by comparing the sub-band interference value with a preset interference threshold, the interference level information indicating one of a first level and a second level, wherein the first level corresponds to the sub-band interference value being greater than the interference threshold, and the second level corresponds to the sub-band interference value being not greater than the interference threshold;

the micro base station transmitting to a macro base station a sub-frame configuration request carrying the interference level information; and the macro base station configuring, in response to the sub-frame configuration request, a sub-frame in a sub-frame configuration mode comprising one of:

in response to determining that the interference level information in the sub-frame configuration request indicates the first level, configuring the sub-frame as an almost blank sub-frame; and in response to determining that the interference level information in the sub-frame configuration request indicates the second level, configuring the sub-frame in segments by blanking a portion of resource elements and reserving remaining resource elements for transmission of user data, wherein the number and position of blanked sub-carriers within each sub-band are determined adaptively based on the reported channel state information including the pre-coding indication, the pre-coding type indication, and the rank indication.

2. The method of claim 1, wherein the macro base station configuring, in response to the sub-frame configuration request, the sub-frame comprises:

the macro base station performing sub-frame coordination with the micro base station to obtain sub-frame coordination information; and the macro base station performing frequency domain selective scheduling based on the sub-frame coordination information to configure the sub-frame.

3. The method of claim 2, further comprising: after the macro base station configuring the sub-frame in response to the sub-frame configuration request, the macro base station transmitting to the micro base station a sub-frame message indicating the sub-frame configuration mode;

in response to the sub-frame message, the micro base station applying the sub-frame configuration mode and notifying the user equipment of the sub-frame configuration mode; and the micro base station feeding back sub-frame configuration state information to the macro base station.

4. The method of claim 3, further comprising: after the micro base station applying the sub-frame configuration mode and notifying the user equipment of the sub-frame configuration mode, the micro base station feeding back available sub-frame mode information to the macro base station.

5. The method of claim 2, wherein a band where the user equipment operates is divided into a plurality of sub-bands one of which is used to carry the sub-frame; and the configuring of the sub-frame in segments comprises reserving a portion of resource elements of the sub-frame for transmission of user data and blanking rest of the resource elements.

6. The method of claim 2, wherein a band where the user equipment operates is divided into a plurality of sub-bands one of which is used to carry the sub-frame; and the configuring of the sub-frame as the almost blank sub-frame comprises blanking all resource elements of the sub-frame.

7. The method of claim 1, wherein the channel state information comprises a channel quality indication, a pre-coding indication, a pre-coding type indication, and a rank indication.

8. The method of claim 7, wherein the micro base station receiving the channel state information reported by the user equipment and calculating the sub-band interference value based on the channel state information comprises:

the micro base station receiving the channel quality indication calculated and reported by the user equipment and calculating the sub-band interference value based on the channel quality indication.

9. A system for reducing channel interference, comprising a micro base station and a macro base station, wherein the micro base station is configured to:

receive channel state information reported by a user equipment and calculate a sub-band interference value based on the channel state information, wherein the channel state information comprises a channel quality indication, a pre-coding indication, a pre-coding type indication, and a rank indication, and the sub-band interference value is calculated based on at least the channel quality indication reported by the user equipment;

generate interference level information by comparing the sub-band interference value with a preset interference threshold, the interference level information indicating one of a first level and a second level, wherein the first level corresponds to the sub-band interference value being greater than the interference threshold, and the second level corresponds to the sub-band interference value being not greater than the interference threshold; and transmit to the macro base station a sub-frame configuration request carrying the interference level information; and the macro base station is configured to configure, in response to the sub-frame configuration request, a sub-frame in a sub-frame configuration mode comprising one of:

in response to determining that the interference level information in the sub-frame configuration request indicates the first level, configuring the sub-frame as an almost blank sub-frame; and in response to determining that the interference level information in the sub-frame configuration request indicates the second level, configuring the sub-frame in segments by blanking a portion of resource elements and reserving remaining resource elements for transmission of user data, wherein the number and position of blanked sub-carriers within each sub-band are determined adaptively based on the reported channel state information including the pre-coding indication, the pre-coding type indication, and the rank indication.

10. The system of claim 9, wherein the macro base station configuring, in response to the sub-frame configuration request, the sub-frame comprises:

the macro base station performing sub-frame coordination with the micro base station to obtain sub-frame coordination information; and the macro base station performing frequency domain selective scheduling based on the sub-frame coordination information to configure the sub-frame.

11. The system of claim 10, after the macro base station configuring the sub-frame in response to the sub-frame configuration request, the macro base station transmitting to the micro base station a sub-frame message indicating the sub-frame configuration mode;

in response to the sub-frame message, the micro base station applying the sub-frame configuration mode and notifying the user equipment of the sub-frame configuration mode; and the micro base station feeding back sub-frame configuration state information to the macro base station.

12. The system of claim 11, after the micro base station applying the sub-frame configuration mode and notifying the user equipment of the sub-frame configuration mode, the micro base station feeding back available sub-frame mode information to the macro base station.

13. The system of claim 10, wherein a band where the user equipment operates is divided into a plurality of sub-bands one of which is used to carry the sub-frame; and the configuring of the sub-frame in segments comprises reserving a portion of resource elements of the sub-frame for transmission of user data and blanking rest of the resource elements.

14. The system of claim 10, wherein a band where the user equipment operates is divided into a plurality of sub-bands one of which is used to carry the sub-frame; and the configuring of the sub-frame as the almost blank sub-frame comprises blanking all resource elements of the sub-frame.

15. The system of claim 9, wherein the channel state information comprises a channel quality indication, a pre-coding indication, a pre-coding type indication, and a rank indication.

16. The system of claim 15, wherein the micro base station receiving the channel state information reported by the user equipment and calculating the sub-band interference value based on the channel state information comprises:

the micro base station receiving the channel quality indication calculated and reported by the user equipment and calculating the sub-band interference value based on the channel quality indication.

* * * * *